United States Patent
Pfeiffer et al.

(10) Patent No.: US 8,171,752 B2
(45) Date of Patent: May 8, 2012

(54) DEVICE FOR ELECTRICALLY GROUNDING A FLOAT GLASS PRODUCTION APPARATUS

(75) Inventors: Thomas Pfeiffer, Ingelheim (DE); Gernot Roeth, Dalheim (DE); Olaf Claussen, Ingelheim (DE); Knut Jakobi, Jena (DE); Andreas Roters, Mainz (DE); Klaus-Dieter Duch, Taunusstein (DE); Ottmar Schuessler, Udenheim (DE)

(73) Assignee: Schott AG, Mainz (DE)

( * ) Notice: Subject to any disclaimer, the term of this patent is extended or adjusted under 35 U.S.C. 154(b) by 388 days.

(21) Appl. No.: 12/480,895

(22) Filed: Jun. 9, 2009

(65) Prior Publication Data
US 2009/0260399 A1 Oct. 22, 2009

Related U.S. Application Data

(63) Continuation of application No. 11/179,966, filed on Jul. 12, 2005, now abandoned.

(30) Foreign Application Priority Data

Jul. 13, 2004 (DE) .......................... 10 2004 033 714

(51) Int. Cl.
*C03B 9/41* (2006.01)
*C03B 18/02* (2006.01)
*C03B 5/16* (2006.01)

(52) U.S. Cl. .......... 65/160; 65/158; 65/182.1; 65/29.12; 65/134.9; 65/134.1; 65/99.2

(58) Field of Classification Search .................... 65/158, 65/161, 160, 182.3, 182.5, 29.12, 134.1, 65/134.9, 135.8, 99.2, 99.4
See application file for complete search history.

(56) References Cited

U.S. PATENT DOCUMENTS

| | | | | |
|---|---|---|---|---|
| 2,710,306 | A | * | 6/1955 | Penberthy ...................... 373/31 |
| 2,932,921 | A | * | 4/1960 | Augsburger ................... 65/158 |
| 2,984,829 | A | * | 5/1961 | Augsburger .................. 340/650 |
| 3,492,107 | A | * | 1/1970 | Simpson et al. .............. 65/99.2 |
| 3,867,121 | A | * | 2/1975 | Trevorrow et al. ............ 65/99.5 |
| 4,029,887 | A | * | 6/1977 | Spremulli ....................... 373/32 |
| 4,227,909 | A | * | 10/1980 | Hornyak et al. ............. 65/135.8 |
| 4,293,730 | A | * | 10/1981 | Myers ........................... 373/135 |
| 4,366,571 | A | * | 12/1982 | Palmquist ....................... 373/30 |
| 5,785,726 | A | * | 7/1998 | Dorfeld et al. .............. 65/134.1 |
| 5,964,913 | A | * | 10/1999 | Titov et al. .................. 65/135.6 |
| 7,628,037 | B2 | * | 12/2009 | Lautenschlaeger et al. . 65/29.12 |
| 2004/0011080 | A1 | * | 1/2004 | Rodek et al. ................. 65/135.1 |
| 2009/0260399 | A1 | * | 10/2009 | Pfeiffer et al. .................. 65/160 |

* cited by examiner

*Primary Examiner* — Jason L. Lazorcik
(74) *Attorney, Agent, or Firm* — Michael J. Striker

(57) ABSTRACT

The float glass apparatus has a glass melt producing unit including a melting tank and a refining tank for the glass melt, a float tank including a metallic basin and metal bath contained in the basin, conducting devices for conducting the glass melt from the glass melt producing unit to the metal bath and auxiliary devices as needed. In order to minimize bubble defects and extend service life of apparatus parts made from platinum or a platinum alloy, the apparatus includes a device for minimizing direct current flowing between the glass melt producing unit and the float tank, which includes an auxiliary electrode connected with ground and located in the glass melt producing unit in electrical contact with the glass melt and a direct electrical connection between the metallic basin of the float tank and ground.

14 Claims, 5 Drawing Sheets

DEVICE FOR ELECTRICALLY GROUNDING A FLOAT GLASS PRODUCTION APPARATUS

CROSS-REFERENCE

This is a continuation of U.S. patent application Ser. No. 11/179,966, filed on Jul. 12, 2005 now abandoned. The aforesaid U.S. patent application describes the invention claimed herein below, is hereby incorporated by explicit reference thereto, and provides the basis for a claim of priority of invention for the invention claimed herein below under 35 U.S.C. 120.

BACKGROUND OF THE INVENTION

1. Field of the Invention

The present invention relates to a device for electrically grounding a float glass production apparatus comprising a float tank with a metal bath; a glass melt producing unit, which comprises a melting tank for making the glass melt and a refining tank for degassing the glass melt; conducting devices for conducting the glass melt from the glass melt producing unit to the metal bath in the float tank and, as required, auxiliary units.

2. Related Art

The production of float glass, especially of special glass, occurs in a so-called flat glass production apparatus of a flat glass plant. The term "float glass production apparatus or plant" in the sense of the present invention means the entire apparatus of a typical structure, i.e. a production unit, which includes the entire hot region from the melting tank and refining tank up to the float bath upstream of the annealing system. Since the hot glass is a good ion conductor, i.e. behaves like an electrolyte, the production steps of the "hot region" are unavoidable, also electrolytically connected with each other. Because of the typical structure of the production unit also part of the glass melt has at least locally direct conducting contact to the metal parts of this apparatus. These metal parts thus can be characterized as or have the character of electrodes, at least in an electrochemical sense. A short-circuited electrochemical battery is realized with each exterior low-resistance connection between each pair or several of these electrodes, e.g. by a common ground. The associated short-circuit current flows as a direct current through the electrolyte glass and can be the cause of bubble-forming or alloy-forming side reactions at the so-called interface, the region between the melt producing vessel and the float tank.

Examples of parts, which have direct contact with the glass and which have the potential to act as electrodes, include grounding electrodes, heated electrodes from Pt, Mo, Ir, etc., glass level meters (operating according to the principle of resistance measurement), direct thermocouple elements, Mo enclosure (for corrosion of the fire-resistant surrounding wall), bottom outlet, outlet pipes, stirrers and shut-off slide (also called "tweel") made of platinum or its alloys with other noble metals and/or coated with these other metals, and the tin bath.

Besides these so-called "notorious" direct electrode types other potential electrodes exists, which indeed have no direct contact with the glass but in spite of that are electrochemically connected to the glass surface. That means all metallic structures with free surfaces in the superstructure of the melting tank and refining tank or of the troughs. Included among these parts are, among others, direct thermo-elements in arched structures, viewing flaps or lids, parts of the overflow, gas and oil burners and parts of the loading apparatus. The electrolytic contact of these indirect electrodes occurs in this case by means of the hot gas atmosphere. Electrochemical equilibrium between the free glass surface and the concerned metal parts is guaranteed when the gas atmosphere contains sufficient amounts of redox active chemical components. Mixtures of redox pairs, water/hydrogen, water/methane or $CO_2$/CO, are examples of redox active chemical components. Appropriate boundary surface reactions and rapid transport of gaseous species in the atmosphere above the melt guarantee exchange and transmission of charge equivalents over large distances—the gas atmosphere thus has quasi-electrolytic properties.

A similar situation exists in a typically grounded float bath, the float tank. The grounding of the glass typically occurs via the liquid tin and the metallic housing. The forming gas atmosphere has direct, surface contact with both and it fulfills the requirements of a buffering redox system with its component mixture, water/hydrogen. Normally because of that it would be guaranteed that the platinum coated tweel at the entrance to the float tank is electrically connected with the float bath ground. The extent of the short circuit can be controlled by the local composition of the forming gas: high hydrogen content in the vicinity of the tweel promotes e.g. current flow from the melting tank to the float tank ground.

The huge difference in the concentration of oxygen in the melting tank and the float bath is the main situation that a direct voltage arises in the apparatus. Oxygen pressure of one to up to two bar must be produced in the refining tank with oxygen-refined special glass, in order to guarantee formation of refined bubbles. In contrast the oxygen pressure in the float bath must be $10^{-15}$ to $10^{-18}$ bar, to prevent coating of the tin bath with a tin oxide layer. A reduction of the concentration difference is thus not possible.

Thus a short circuit electrochemical chain arises so that direct currents flow from anode to cathode (positive current flow) in the glass. The interior resistance of this short-circuited battery is the sum of all partial resistances for charge transport and boundary surface conversion. The current strength is then the quotient of the battery voltage and the total resistance.

The current flow has consequences for
- local bubble formation at all phase transitions between glass and metal, e.g. at joining points between outlet pipe segments made of Pt, at stirrer surfaces, at the tweel and at glass/Sn contacts;
- local corrosion of Pt components at the interface because of increased incorporation of alloyable glass components, especially Sn, Si, . . . ;
- the monitoring of the electrochemical potential of metallic components, special stirrers, outlet pipe segments or tweel. The direct currents in the measurement path, reference/component are always considered in evaluating electromotive forces, which are measured between the concerned component and a suitable reference electrode.

The essential prerequisite for occurrence of direct current flow with disadvantageous effects is the existence of a sufficiently low-resistance connection between at least two potential electrodes. This sort of connection is realized intentionally or unintentionally by a so-called ground connection in the daily production routine.

Intentional ground conditions are frequently closely connected with regulations for guaranteeing personal safety. They replace laborious or elaborate safety measures for routine handling. Likewise frequently ground-free construction of an apparatus means an expensive selection of materials during design or it simply is not a useful solution.

If the principle of ground-free construction is not part of the specifications of the apparatus, there are consequences. Once built up, many ground connections may not be undone with reasonable effort or expense.

The most important example here is the tin bath in the float tank, whose subsequent ground disconnection is not possible. Generally the liquid tin in the completely hot region remains the single direct connection to ground, but all would still be in order from an electrochemical viewpoint, when the current circuit is not closed on account of the absent second and further ground connections.

However other grounds may exist based on that. The supply apparatus, the overflow and the burners in the melting tank come into question. Subsequent ground disconnection is indeed possible in principle but only with a great effort or expense. The electrical contact here occurs by means of the furnace atmosphere, i.e. an actual ground circuit formed is high resistance. Typically also the ground is not definitely localized and it is characterized as a virtual ground.

Usually all measuring units (thermocouple elements, glass level meters), viewing closures, stirrers and all components at the interface, which are made of platinum or its alloys with other noble metals, are built-in without grounding without further effort.

Every noble metal uncoated tweel is designed "weakly" grounded by the forming gas atmosphere (i.e. a high resistance ground).

Additional grounds may exist at the so-called cold end, i.e. at the cooling sheet; however they are all not damaging from an electrochemical viewpoint and thus must be not considered further.

SUMMARY OF THE INVENTION

It is an object of the present invention to provide a float glass production apparatus with a device for electrically grounding that minimizes a direct current dependent on electrochemical effects flowing between the glass melting tank and a downstream float tank in order to suppress boundary surface reactions and thus minimize bubble formation and corrosion during the glass production process.

This object and others, which will be made more apparent hereinafter, are attained in a float glass production apparatus comprising a float tank including a metallic basin and a metal bath contained in the metallic basin, a glass melt producing unit that includes a melting tank for making a glass melt and a refining tank for degassing the glass melt, conducting devices for conducting the glass melt from the glass melt producing unit to the metal bath of the float tank, and auxiliary devices as needed.

According to the invention the float glass production apparatus includes a device for minimizing direct current flowing between the glass melt producing unit and the float tank, which comprises at least one auxiliary electrode connected with ground and located in the glass melt producing unit so as to be in electrical contact with the glass melt when the glass melt is present in the glass melt producing unit and a direct electrical connection between the metallic basin of the float tank and ground.

The troublesome direct current flows can be minimized in a surprising way by the features of the aforesaid float glass production apparatus according to the invention.

Further embodiments and additional aspects of the invention are set forth in the appended dependent claims, and in the following description of the preferred embodiments.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

The first production unit of a float glass production apparatus according to the invention comprises a glass melt producing unit with a melting tank 1, in which a predetermined batch of starting materials is melted in a known way to form the glass to be floated. The required melt energy is supplied in a known manner. The melting tank 1 is structured in a known manner in the longitudinal direction (not shown). There is first a feed region for the batch. A melt region up to an outlet nozzle or up to a flow-through wall (in case it is present) forms the actual melting vessel, which is associated with a so-called superstructure, in which the gas burner for melting the batch is arranged. The connected region between the outlet nozzle and the overflow wall is the refining tank I. The region between the overflow wall and the flow-through unit is the so-called refining tank II.

An electro-additional heating device can be provided in the melting tank or in the refining tank I.

The refining tank and the melting tank form the so-called glass melt producing unit.

The melting tank 1 has a known structure made from fire-resistant material, which has largely unknown grounds with a similarly unknown high internal resistance.

Figure 1:
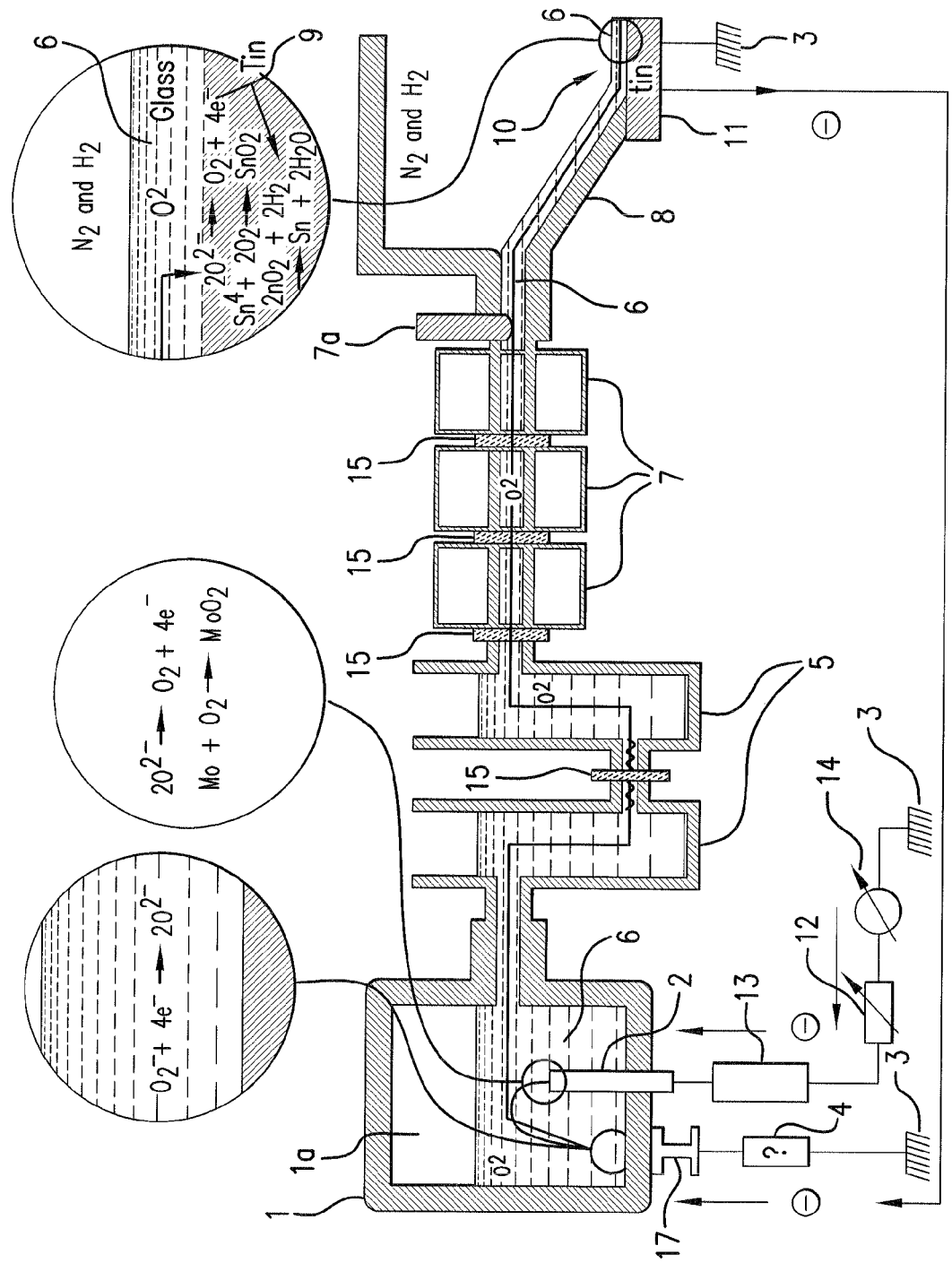
FIG. 1 is a diagrammatic cross-sectional view of the entire hot region of a float glass production apparatus comprising a glass melt producing unit, interface and float tank, along with the chemical reactions occurring therein.

As shown from FIG. 1 the fire-resistant material of the melting tank 1 has symbolically indicated steel supports 17, which for their part are embedded in the bottom of the melting tank 1 and have a conducting contact to equipotential busbars (safety grounds) of the apparatus. The unknown total resistance of this arrangement is indicated symbolically by the resistance 4 with a "?" in the figures. This high internal resistance is largely determined by the oven atmosphere 1$a$ above the melt bath. Furthermore at least one electrode 2 immersed in the melt bath is mounted on the melting tank, whose function is described later.

The principle electrochemical processes occurring at the symbolic ground point 3 shown in FIG. 1, at the melting tank and at the electrodes 2, which preferably comprise molybdenum, are shown in the circular detail cutouts in FIG. 1.

At least one stirred crucible 5 each with an unshown metallic stirrer is connected to the melting tank 1. The embodiments shown in FIGS. 1 to 3 have two stirred crucibles.

The glass melt 6 flows into a longitudinally extended pipe, which comprises at least one electrically heated noble metal pipe segment 7. In the embodiment shown in FIG. 1 there are three pipe segments 7 and the embodiments shown in FIGS. 2 and 3 there are two pipe segments. The glass melt 6 flows over an overflow at the end of the longitudinally extend pipe under flow control by means of a controlling slider 7a, the so-called tweet, and over a downwardly inclined lip block 8, the so-called "spout lip", to a tin bath 9 in the float tank 10. The glass melt then spreads out over the tin bath 9 and is brought to the desired thickness.

In order to minimize the undesirable direct current through the so-called interface comprising the at least one stirred crucible 5, at least one pipe segment 7 and the tweel 7a, disks 15 made from electrically insulating ceramic material are mounted or placed between all platinum components or parts.

After the glass ribbon or sheet has obtained the desired fire polishing, it is continuously drawn from the tin surface, relaxed in an annealing lehr and packaged in the cutting section. However these steps are not illustrated or explained further herein because they do not have any significance for the grounding problem according to the invention.

The float tank 10 comprises a steel basin 11, which is connected with the ground 3, and which is provided with a fire-resistant material cladding for receiving a tin bath 9 and a superstructure for receiving a suspended cover and a float bath heater, which have not been illustrated. Furthermore a reducing atmosphere (6-12% $H_2$, 88-94% $N_2$) is required in the float tank. The essential electrochemical processes arising between the glass melt 6 loaded with negatively charged oxygen ions and the tin bath 9 are illustrated in detail in circular detail cutouts in FIG. 1.

As explained earlier, the electrochemical processes damage the glass melt 6 in harmful ways because of the "unintended" ground circuit, especially in the melting tank 1. Furthermore it is clearly explained that a subsequent complete disconnection of the melting tank 1 from ground in order to avoid these detrimental effects is no longer possible both in construction of new production apparatus and also in optimizing existing plants.

The quasi "electrochemically correct" structure for an ideal float plant simply comprises in this respect only a single ground connection in the entire apparatus, e.g. via the metal housing of the steel basin 11 of the float tank 10.

At least one further ground of the melting tank 1 besides the float bath ground exists in a real apparatus under participation of the superstructure atmosphere 1a. However the comparatively high self-resistance of the gas and the boundary surface glass/gas offers the possibility for successful use of "equivalent or artificial circuits". The term "equivalent or artificial circuits" means that the charge flows are diverted so that they produce no damaging consequences at the interface, at tweel 7a or in the float tank 10.

The self-resistance of the superstructure ground largely determines the interior resistance 4 of the corresponding battery circuit, so that each additional current load must in principle lead to a drop of the clamping voltage. Naturally this is the same for each battery, however after a first attempt and measurement at the float tank it has been shown that the potentially available charge amounts are actually greatly reduced.

The invention consists, among other things, in recognizing that required limitation of these battery currents in the conventional melting tank can be easily achieved by construction of additional auxiliary grounds. The auxiliary grounds guide or conduct damaging direct currents from the superstructure directly to the float bath via the grounded auxiliary electrodes, while at the same time weakening the undesired currents in the interface.

Figure 4:
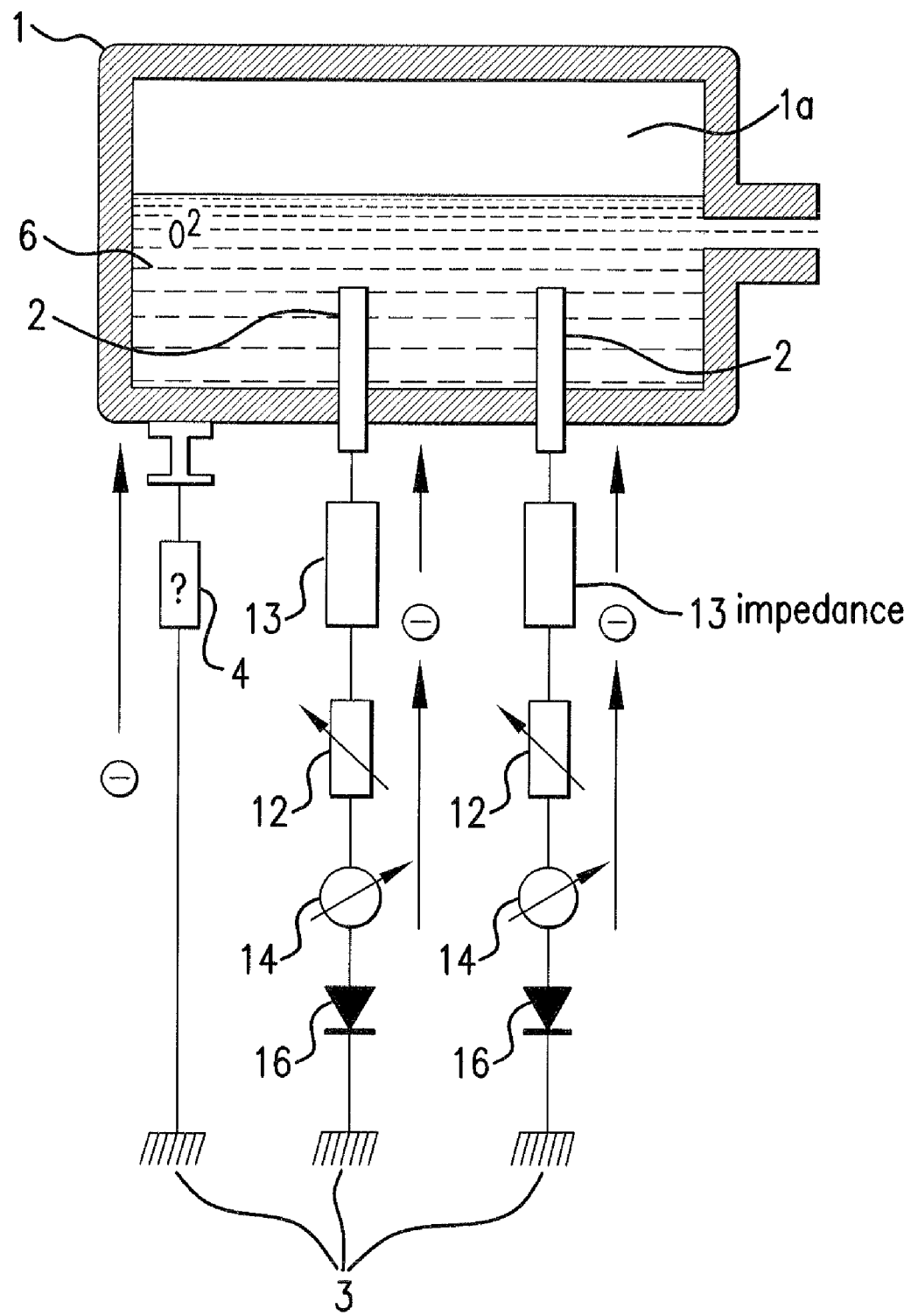
FIG. 4 is a glass melting tank part of the float glass producing apparatus according to FIG. 1 with a tank equipped with two auxiliary electrodes, in which rectifiers or diodes are built into each auxiliary electrode circuit to prevent current from flowing through both auxiliary electrodes in different directions (short circuiting current circuit)

The additional grounds are most advantageously constructed as grounded Mo or W electrodes 2. The Pt electrodes used as temporary expedients however are greatly endangered by alloy formation and subsequent dissolving. The best electrode position for the melting tank is in the refining tank II. Every additional melting tank auxiliary ground made by means of the grounded auxiliary electrode 2, as shown in FIG. 4, especially in the vicinity of the feed apparatus, burner or overflow, increases the desired effect. The best position in the distributor (in case a heated superstructure exists there) is at the level of the burner.

Mo and W have a side effect when used as auxiliary electrodes. They function like an active electrode with the boundary surface Mo/glass or W/glass and they generate an additional battery circuit between the auxiliary electrode 2 and tweel/float tank in the grounded state. This current is the opposite from the usual current between the superstructure and the tweel/float tank. The currents may be balanced out by building in a controlling ohmic resistance 12 between the auxiliary electrode 2 and the ground 3, so that the residual current in part between the melting tank and the float tank, the interface, is zero.

In the melting tank with additional electro-heating it is necessary to block the alternating-current-side ground of the auxiliary electrode(s) 2. For this purpose suitable impedance 13 is connected in series with the ohmic resistance 12.

In principle it is also possible that the current flows through one auxiliary electrode 2 from the tank to ground and through the other from the ground to the tank when several auxiliary electrodes 2 are used (FIG. 4). That is especially possible when the auxiliary electrodes are made from different materials or different temperatures clearly exist at auxiliary electrodes or the composition of the glass melt differs significantly at the respective locations of the auxiliary electrodes. In the worst case all three effects mutually reinforce and augment each other. In this case the embodiment shown in FIG. 4 is employed. This problem is easily eliminated by building in a rectifier or a diode 16, which permits current flow in only one direction.

Figure 2:
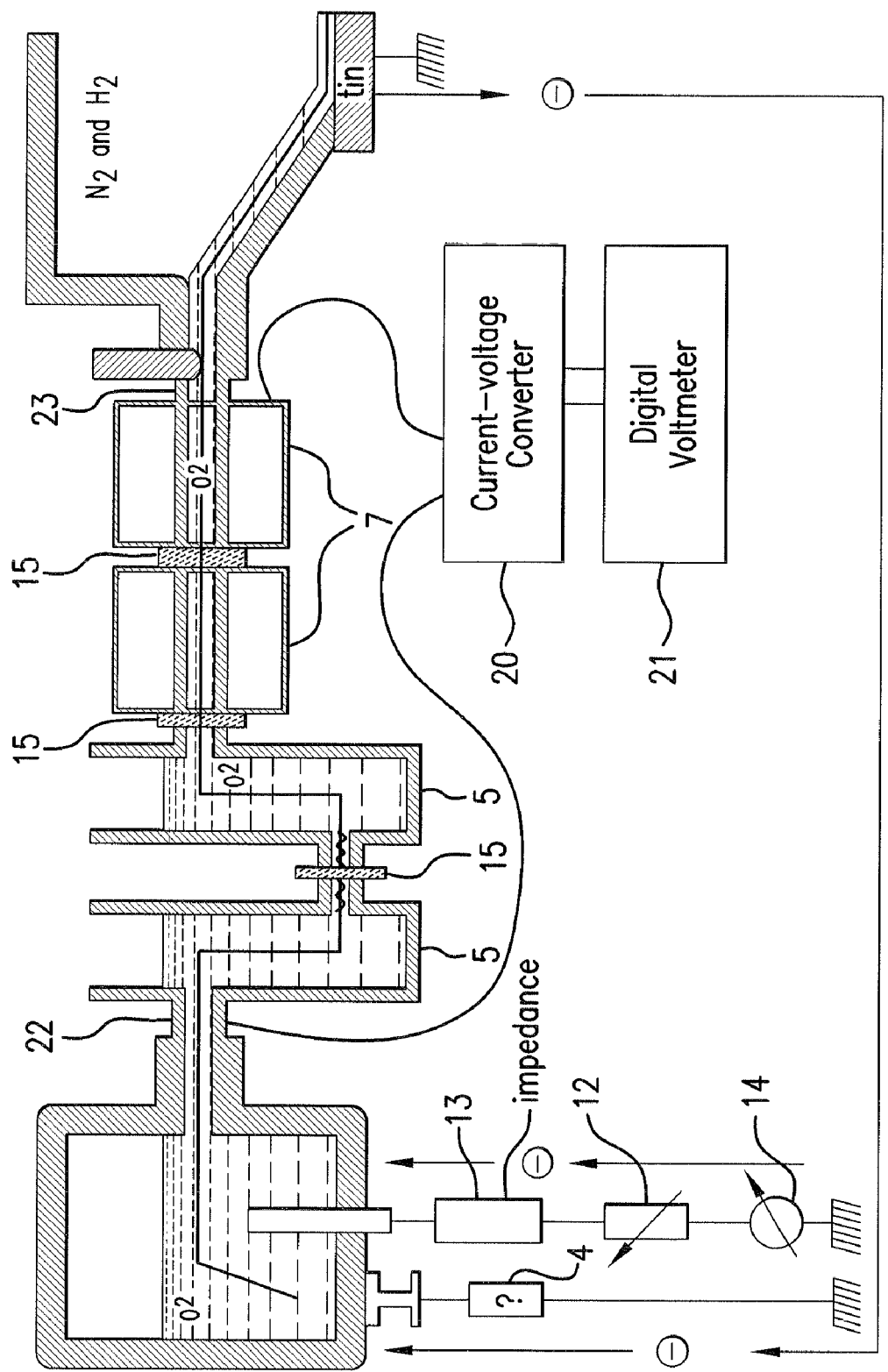
FIG. 2 is a diagrammatic cross-sectional view of another embodiment of a float glass production apparatus similar to that of FIG. 1, but with a modified interface, with a direct measurement of the current, which flows through the interface.

The invention additionally includes an embodiment with a current meter or measuring device in the "interface". Two insulated, electrically conducting, non-corrosive and chemically identical components are put in direct contact with the glass for this purpose. Pt or a suitable Pt alloy is the preferred material. The components are arranged parallel to the glass and current flow, they should have the same temperatures and they should "see" the same chemical environment. FIG. 2 shows the structure of a suitable current measuring device 20, 21. A current-voltage converter 20 is connected between an entrance flange 22 of the first stirred crucible 5 and an outlet flange 23 of the final pipe segment 7. The current flowing between the melting tank 1 and the float bath 10 flows to the ground via the lower input resistance of the current-voltage converter almost exclusively and no longer through the glass melt. The output voltage of the converter 20 is measured with the voltmeter 21 and converted to a current value.

A current meter 14 indicates the direct current to be controlled.

An additional embodiment of the invention considers changing electrolytic properties of the superstructure atmosphere under changing firing conditions (fuel and oxidizer amounts) and generally under changing temperature distributions in the furnace superstructure and in the melting tank (additional electro-heating, throughput) or the chemical composition of the melt.

All these changes have a principal effect both on the source voltage and also on the internal resistance of the "battery". It would then be significant to control the protective currents flowing through the auxiliary electrodes automatically so that the damaging currents in the interface remain minimal.

Figure 5:
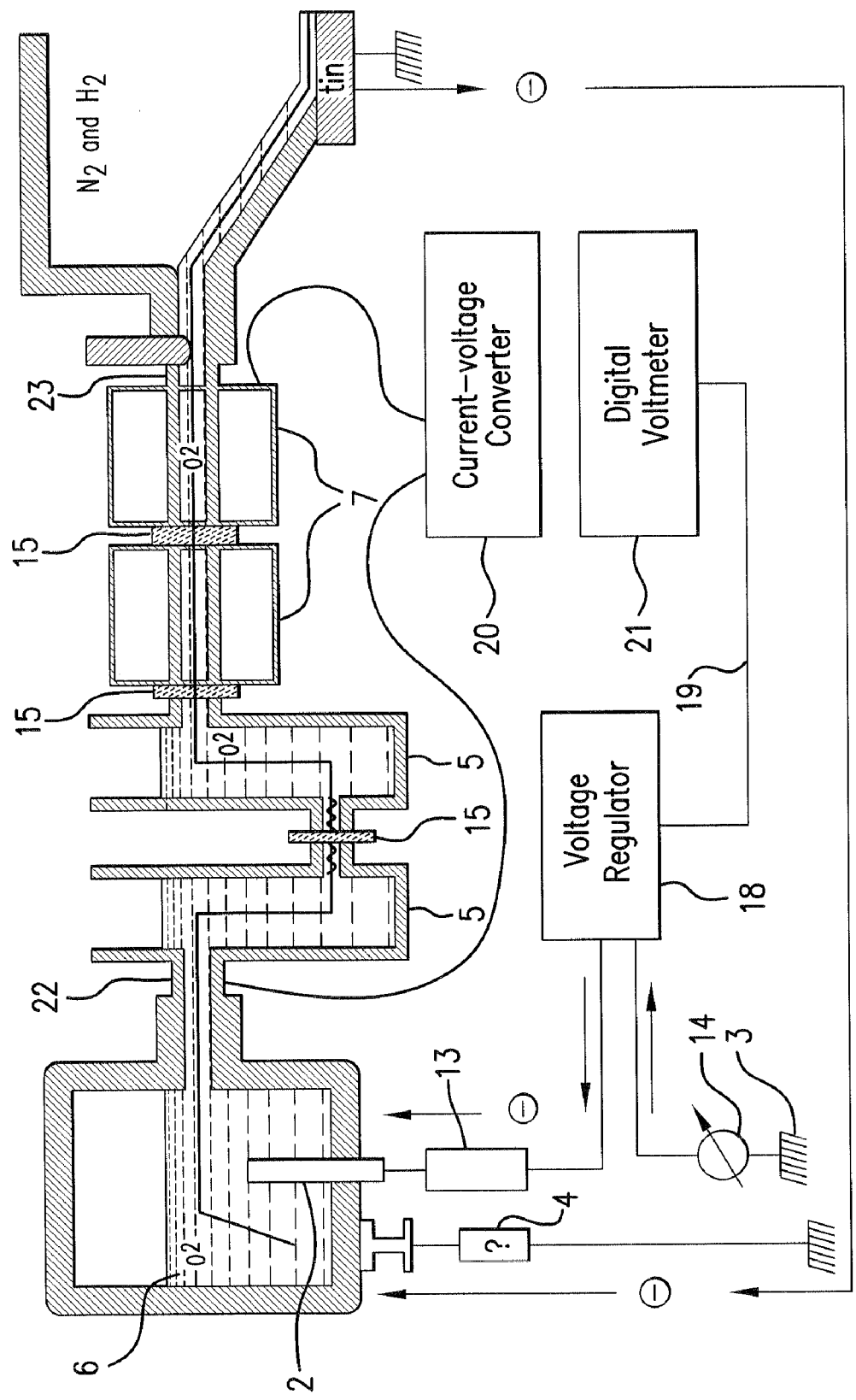
FIG. 5 is a glass float producing apparatus according to FIGS. 2 and 3 with automatic current regulation.

FIG. 5 shows the structure of this sort of automated current controller using only a single auxiliary electrode 2. The current measurement is as described above in relation to the embodiment shown in FIG. 2. The measured value of the digital volt meter 21 is stored via a conductor 19 as an actual value in a current controller 18, which controls the current flowing to ground 3 from the melt 6 via the electrode 2, the impedance 13 and the meter 14, so that the current flow between the entrance flange 22 of the first stirred crucible and the outlet flange 23 of the second pipe segment 7 is minimized.

Alternatively to the direct current measurement according to FIGS. 2 and 5 the current measurement can also occur indirectly by means of a voltage measurement between two suitable reference electrodes (e.g. $ZrO_2^-$, Mo or W electrodes) with respective exactly known temperatures. They should be likewise positioned parallel for testing the current flow, analogous to the positions in FIGS. 2 and 5.

Figure 3:
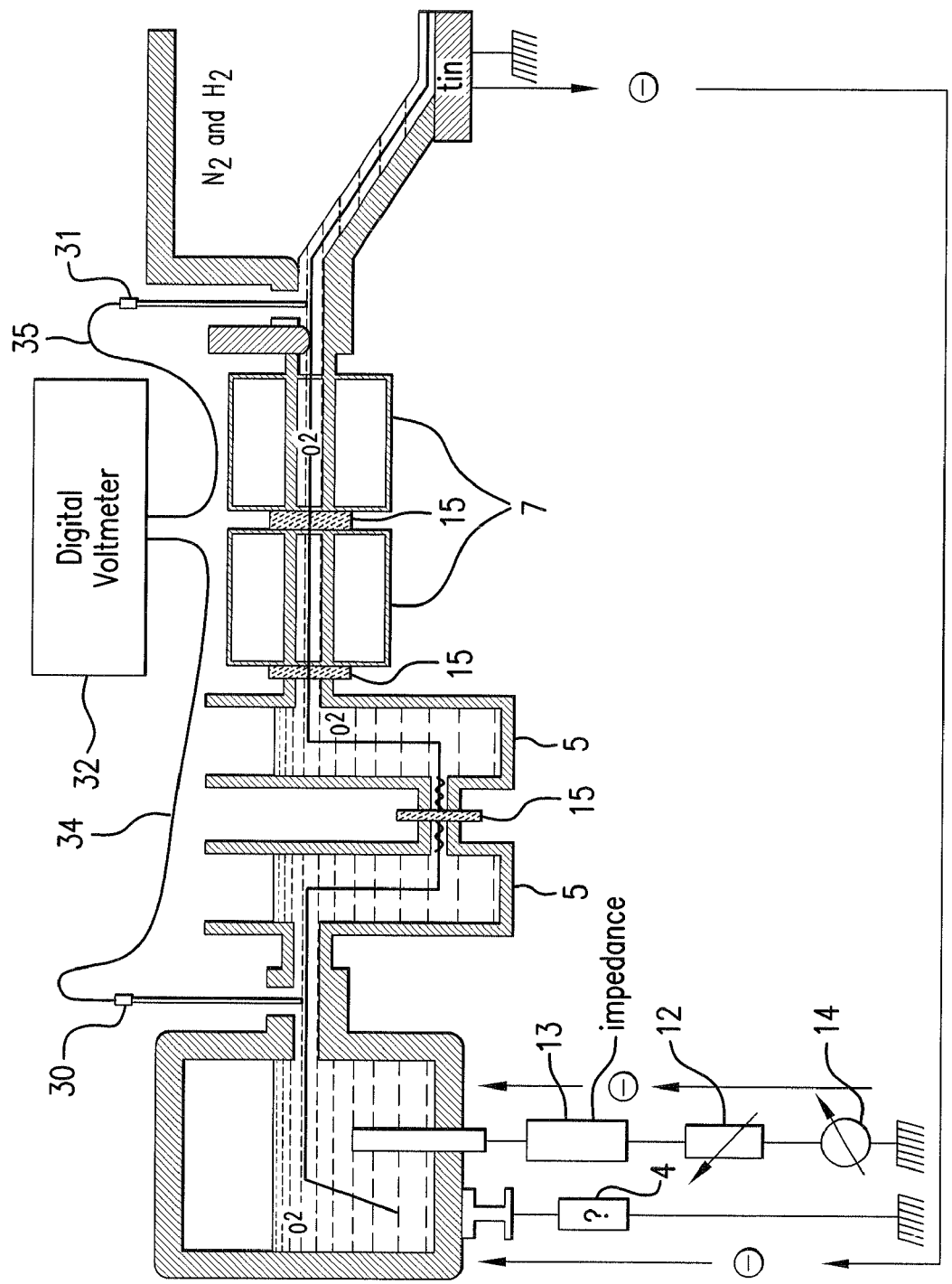
FIG. 3 is a diagrammatic cross-sectional view of another embodiment of a float glass production apparatus similar to that of FIG. 2, but with an indirect measurement of the current, which flows through the interface.

FIG. 3 shows the structure of this embodiment using indirect current measurement. $ZrO_2$ reference electrodes 30, 31 are used as the electrodes. The voltage between the reference electrodes 30, 31 is measured with the help of a digital volt meter 32, which is connected to the respective reference electrodes 30 and 31 by means of conductors 34 and 35. Their resistances are calculated from length, cross-section, specific resistance and temperature of the melt. The current can be calculated without problem from resistance and voltage.

Auxiliary electrodes 2, controlling resistor 12, impedance 13 and current meter 14 form a unit according to the invention. The regulation of the effective resistance between tweel and float bath ground operates by local adjustment of the float bath atmosphere independently in the sense of an additional current limitation. Additional features or measures of the invention include elimination of grounds of all remaining metal parts in direct contract to the melt and, as much as possible, putting metal parts in direct contact with the hot superstructure gasses, which is helpful.

The invention provides an advantageous grounding of the melting tank for suppressing or minimizing current flow between the melting tank and the float tank in order to control the boundary surface reactions (minimize bubble formation and corrosion) in the production process. Particularly minimizing corrosion especially extends the service live of Pt parts.

The grounding of the melting tank causes, as observed electrically, the float glass production apparatus to act as an electrochemical concentration cell with current distribution or division.

PARTS LIST

| | |
|---|---|
| 1 | melting tank |
| 1a | superstructure atmosphere |
| 2 | electrode |
| 3 | ground |
| 4 | internal resistance |
| 5 | stirred crucible |
| 6 | glass melt |

-continued

PARTS LIST

| | |
|---|---|
| 7 | noble metal pipe segment |
| 7a | tweel |
| 8 | lip block |
| 9 | tin bath |
| 10 | float tank |
| 11 | steel basin |
| 12 | ohmic resistance |
| 13 | impedance |
| 14 | current meter |
| 15 | ceramic material |
| 16 | rectifier or diode |
| 17 | steel support |
| 18 | current controller |
| 19 | electrical conductor |
| 20 | current-voltage converter |
| 21 | digital voltmeter |
| 22 | entrance flange |
| 23 | outlet flange |
| 30, 31 | reference electrode |
| 32 | digital voltmeter |
| 34, 35 | conductors |

The disclosure in German Patent Application 10 2004 033 714.4-45 of Jul. 13, 2004, which provides the basis for a claim of priority of invention, is hereby incorporated herein by explicit reference thereto. This German Patent Application also describes the invention described hereinabove and claimed in the claims appended herein below and provides the basis for a claim of priority for the present invention under 35 U.S.C. 119 (a) to (d).

While the invention has been illustrated and described as embodied in a float glass production apparatus with an electrical device for minimizing direct current flow between the melting tank and the float tank, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A float glass production apparatus comprising:
   a glass melt producing unit including a melting tank for making a glass melt and a refining tank for degassing the glass melt;
   a float tank including a metallic basin and a metal bath contained in the metallic basin;
   conducting devices for conducting the glass melt from the glass melt producing unit to the metal bath contained in the float tank; and
   a device for minimizing direct current flowing between the glass melt producing unit and the float tank, said device for minimizing said direct current comprising
   at least one auxiliary electrode connected with ground via a variable resistor and located in the glass melt producing unit so as to be in electrical contact with the glass melt when the glass melt is present in the glass melt producing unit; and
   an electrical connection between the metallic basin of the float tank and ground;
   whereby said direct current flowing between the glass melt producing unit and said float tank is minimized.

2. The float glass production apparatus as defined in claim 1, wherein the melting tank has safety grounds.

3. The float glass production apparatus as defined in claim 1, wherein the at least one auxiliary electrode in electrical contact with the glass melt is located in the refining tank of the glass melt producing unit.

4. The float glass production apparatus as defined in claim 1, wherein said device for minimizing said direct current comprises an impedance connected in series with said ohmic resistor and located between said ground and said at least one auxiliary electrode.

5. The float glass production apparatus as defined in claim 4, wherein said device for minimizing said direct current comprises a rectifier connected in series with the impedance and the ohmic resistor and located between said ground and said at least one auxiliary electrode so that current flow from the melting tank to said ground is prevented.

6. The float glass production apparatus as defined in claim 1, wherein said at least one auxiliary electrode comprises molybdenum, tungsten, an alloy of said molybdenum, or an alloy of said tungsten.

7. The float glass production apparatus as defined in claim 1, wherein said metallic basin is directly connected with said ground without intervening devices between said ground and said metallic basin.

8. The float glass production apparatus as defined in claim 1, further comprising an auxiliary electro-heating unit with a plurality of heating electrodes, and wherein said at least one auxiliary electrode comprises one of said heating electrodes.

9. The float glass production apparatus as defined in claim 8, wherein said at least one auxiliary electrode comprises all of said heating electrodes present in said auxiliary electro-heating unit.

10. A float glass production apparatus comprising:
a glass melt producing unit including a melting tank for making a glass melt and a refining tank for degassing the glass melt;
a float tank including a metallic basin and a metal bath contained in the metallic basin;
conducting devices for conducting the glass melt from the glass melt producing unit to the metal bath contained in the float tank;
a device for minimizing direct current flowing between the glass melt producing unit and the float tank, said device for minimizing said direct current comprising
at least one auxiliary electrode connected with ground and located in the glass melt producing unit so as to be in electrical contact with the glass melt when the glass melt is present in the glass melt producing unit;
a direct electrical connection between the metallic basin of the float tank and ground;
a current measuring device for measuring said direct current, said current measuring device being electrically connected between an outlet of the glass melt producing unit and the float tank; and
a current regulating device electrically connected between said at least one auxiliary electrode and said ground, wherein said current regulating device is responsive to a measured value of said direct current determined by the current measuring device so that said direct current is minimized.

11. The float glass production apparatus as defined in claim 10, wherein the melting tank has safety grounds.

12. The float glass production apparatus as defined in claim 10, wherein said current measuring device comprises a digital voltmeter.

13. A float glass production apparatus comprising:
a glass melt producing unit including a melting tank for making a glass melt and a refining tank for degassing the glass melt;
a float tank including metallic basin and a metal bath contained in the metallic basin;
conducting devices for conducting the glass melt from the glass melt producing unit to the metal bath contained in the float tank; and
a device for minimizing direct current flowing a between the glass melt and the float tank, said device for minimizing comprising
at least one auxiliary electrode connected with ground and located in the a glass melt producing unit so as to be in electrical contact with the glass melt when the lass melt is present in the glass melt producing unit;
a direct electrical connection between the metallic basin of the float tank and ground;
a current measuring device for measuring said direct current said current measuring device being electrically connected between an outlet of the a lass melt producing unit and the float tank; and
current regulating device electrically connected between said at least one auxiliary electrode and said ground, wherein said current regulating device is responsive to a measured value of said direct current determined b the current measuring device, so that said direct current is minimized;
wherein said current measuring. device comprise a digital voltmeter,
wherein said current regulating device is electrically connected with and responsive to said digital voltmeter, and
wherein said current regulating device comprises an impedance electrically connected between said digital voltmeter and said at least one auxiliary electrode and a current meter electrically connected between said digital voltmeter and said ground.

14. A float glass production apparatus comprising;
a glass melt producing unit including a melting tank for making a glass melt and a refining tank for degassing the glass melt;
a float tank including a metallic basin and a metal bath contained in the metallic basin;
conducting devices for conducting the glass melt from the glass melt producing unit to the metal bath contained in the float tank; and
a device for minimizing direct current flowing between the glass melt and the float tank, said device for minimizing comprising
at least one auxiliary electrode connected with ground and located in the glass melt producing unit so as to be in electrical contact with the glass melt when the glass melt is present in the glass melt producing unit;
a direct electrical connection between the metallic basin of the float tank and, ground;
a current measuring device for measuring said direct current, said current measuring device being electrically connected between an outlet of the glass melt producing unit and the float tank; and
a current regulating device electrically connected between said at least one auxiliary electrode and said ground, wherein said current regulating device is responsive to a measured value of said direct current determined by the current measuring device so that said direct current is minimized;

wherein said current regulating device comprises a controlling resistor, a current meter and an impedance, and wherein said controlling resistor, said current meter, and said impedance are electrically connected in series with each other and between said at least one auxiliary electrode and said ground.

* * * * *